United States Patent [15] 3,639,059

Strumor et al. [45] Feb. 1, 1972

[54] GRAPHIC-PROCESSING APPARATUS

[72] Inventors: Mathew A. Strumor, New Rochelle, N.Y.; Ervin J. Rachwal, Framingham; Douglas B. Campbell, Natrick; Robert W. Marculewicz, Manchester, all of Mass.

[73] Assignee: Matrographics, Inc., New York, N.Y.

[22] Filed: Feb. 10, 1969

[21] Appl. No.: 805,088

[52] U.S. Cl. ....................355/86, 355/53

[51] Int. Cl. ....................G03b 27/04

[58] Field of Search ....................355/40, 53, 85, 86

[56] References Cited

UNITED STATES PATENTS

| | | | |
|---|---|---|---|
| 2,537,353 | 1/1951 | Kilminster | 355/86 |
| 2,763,182 | 9/1956 | Urban | 355/40 X |
| 2,889,758 | 6/1959 | Bolton | 355/14 X |
| 3,010,376 | 11/1961 | Johnson | 355/85 |
| 3,354,806 | 11/1967 | De Lang | 355/41 X |
| 3,472,591 | 10/1969 | Frohlich | 355/53 |
| 3,494,695 | 2/1970 | Sollima | 355/53 X |
| 3,498,711 | 3/1970 | Ables | 355/95 X |

*Primary Examiner*—John M. Horan
*Attorney*—Kenneth S. Goldfarb

[57] ABSTRACT

A process and apparatus for making printing plates with composite images for lithography and the like in which an imaging head is adapted to carry a series of photographic images to be registered on a printing plate. The head is mounted on apparatus for setting it to a set of positions each in registry with a different location on the plate, and includes a flash lamp for exposing the plate to the several images, whereby the need for manual imposition is eliminated.

15 Claims, 20 Drawing Figures

Mathew A. Strumor
Ervin J. Rachwal
Robert W. Marculewicz
Douglas B. Campbell
INVENTORS
BY Rich & Ericson
Attorneys Mathew A. Strumor
Ervin J. Rachwal
Robert W. Marculewicz
Douglas B. Campbell
INVENTORS BY Rich & Ericson
Attorneys Mathew A. Strumor
Ervin J. Rachwal
Robert W. Marculewicz
Douglas B. Campbell
INVENTORS BY Rich & Ericson
Attorneys Mathew A. Strumor
Ervin J. Rachwal
Robert W. Marculewicz
Douglas B. Campbell
INVENTORS
BY Rich & Ericson
Attorneys Mathew A. Strumor
Ervin J. Rachwal
Robert W. Marculewicz
Douglas B. Campbell
INVENTORS
BY Rich & Ericson
Attorneys Mathew A. Strumor
Ervin J. Rachwa
Robert W. Marculewicz
Douglas B. Campbell
INVENTORS
BY Rich & Ericson
Attorney Mathew A. Strumor
Ervin J. Rachwal
Robert W. Marculewicz
Douglas B. Campbell
INVENTORS
BY Rich & Ericson
Attorneys Mathew A. Strumor
Ervin J. Rachwal
Robert W. Marculewicz
Douglas B. Campbell
INVENTORS BY Rich & Ericson
Attorneys Mathew A. Strumor
Ervin J. Rachwal
Robert W. Marculewicz
Douglas B. Campbell
INVENTORS BY Rich & Ericson
Attorneys Mathew A. Strumor
Ervin J. Rachwal
Robert W. Marculewicz
Douglas B. Campbell
INVENTORS
BY Rich & Ericson
Attorneys Mathew A. Strumor
Ervin J. Rachwal
Robert W. Marculewicz
Douglas B. Campbell
INVENTORS
BY Rich & Ericson
Attorneys Mathew A. Strumor
Ervin J. Rachwal
Robert W. Marculewicz
Douglas B. Campbell
INVENTORS
BY Rich & Ericson
Attorneys Mathew A. Strumor
Ervin J. Rachwal
Robert W. Marculewicz
Douglas B. Campbell
INVENTORS
BY Rich & Ericson
Attorneys Mathew A. Strumor
Ervin J. Rachwal
Robert W. Marculewicz
Douglas B. Campbell
INVENTORS BY Rich & Ericson
Attorneys

GRAPHIC-PROCESSING APPARATUS

Our invention relates to the art of printing, and particularly to a novel method and apparatus for preparing printing plates for lithography and the like.

In the conventional process of preparing a lithographic plate for printing a book or the like from a series of page plates, a sensitized aluminum plate is arranged on an imposing table and an operator places a predetermined series of page plates, each comprising a photographic transparency of a particular page in a book to be printed, on the plate. The plate is then exposed through the set of transparencies, and developed. The developed plate is mounted on a printing roll, inked, and rolled into contact with a paper sheet. In that manner, a sheet of paper containing a number of printed pages of the book is so formed that it can be made into a portion of the final book of cutting and folding the printed sheet.

In order to accomplish this purpose, the operator must very carefully register each page plate on the lithographic plate and then strip it in by taping it to the plate. Both the registration of the plates and their sequence is critical, since if a page is not in the proper order, the bookmaking process cannot be carried out after the plate is printed. After all the page plates have been stripped in, the operator then opaques any pinholes and attends to any other retouching that may be necessary.

After the page plates have been stripped in, they are contact printed on the plate with a very bright light, usually applied by rolling the light across the plate, so that a really intense light can be applied at each point of the plate. The intense light is necessary because the conventional lithographic plate is coated with a diazoprocess resist that is relatively insensitive to light and requires a large exposure. After exposure, the transparencies are removed, and the plate is developed and then placed around a drum for the printing operation.

When all the plates for the book are made, a sample copy if run off, and the book is checked. If there has been an error in the location of a page on the plate, it may be necessary to revise many or all of the plates to correct it. As the revision process involves the laborious manual imposition described above, it would obviously be highly desirable to minimize the errors that occur in the original makeup of the plates.

Another problem that has considerably increased complexity of the printing process, particularly as applied to the preparation of reference works which must be updated at frequent intervals, is that the addition or subtraction of material from a published work means a complete revision of the plates to produce a new sequence of multiple image plates that will print out on paper that can be folded and cut to make up a new edition. The problem is one that is susceptible to mathematical treatment, but in view of the fact that the steps of manual imposition required are expensive and time consuming, there is still an undesirably large quantity of labor involved in the preparation of a new edition. The objects of our invention are to facilitate the preparation of multiple image plates, and to simplify the process of printing a new edition from an edited version of an old edition.

The above and other objects of our invention are attained by a process of platemaking in which the usual steps of manual imposition are omitted. Rather, we provide a novel apparatus for the automatic preparation of multiple image plates with the aid of which plate makeup can be reduced to the mathematical operation of programming the desired layout. Basically, the apparatus involves a composing machine that will automatically make up an ordered sequence of page plates having a predetermined relation to the page layout that will be followed, together with an automatic imposing machine that will act on the page plates to produce a finished sequence of plates ready for printing. As it will appear, the apparatus is arranged so that modifications of the printing sequence can be readily made without the necessity for conventional precision imposition.

The method and apparatus of our invention, and its mode of operation, will best be understood in the light of the following detailed description, together with the accompanying drawings, of various illustrative embodiments thereof.

In the drawings:

FIG. 1 comprises a flow sheet illustrating a complete process of platemaking in accordance with our invention;

FIG. 2 comprises a schematic perspective layout sketch of an automatic imposing machine in accordance with our invention;

Figure 14:
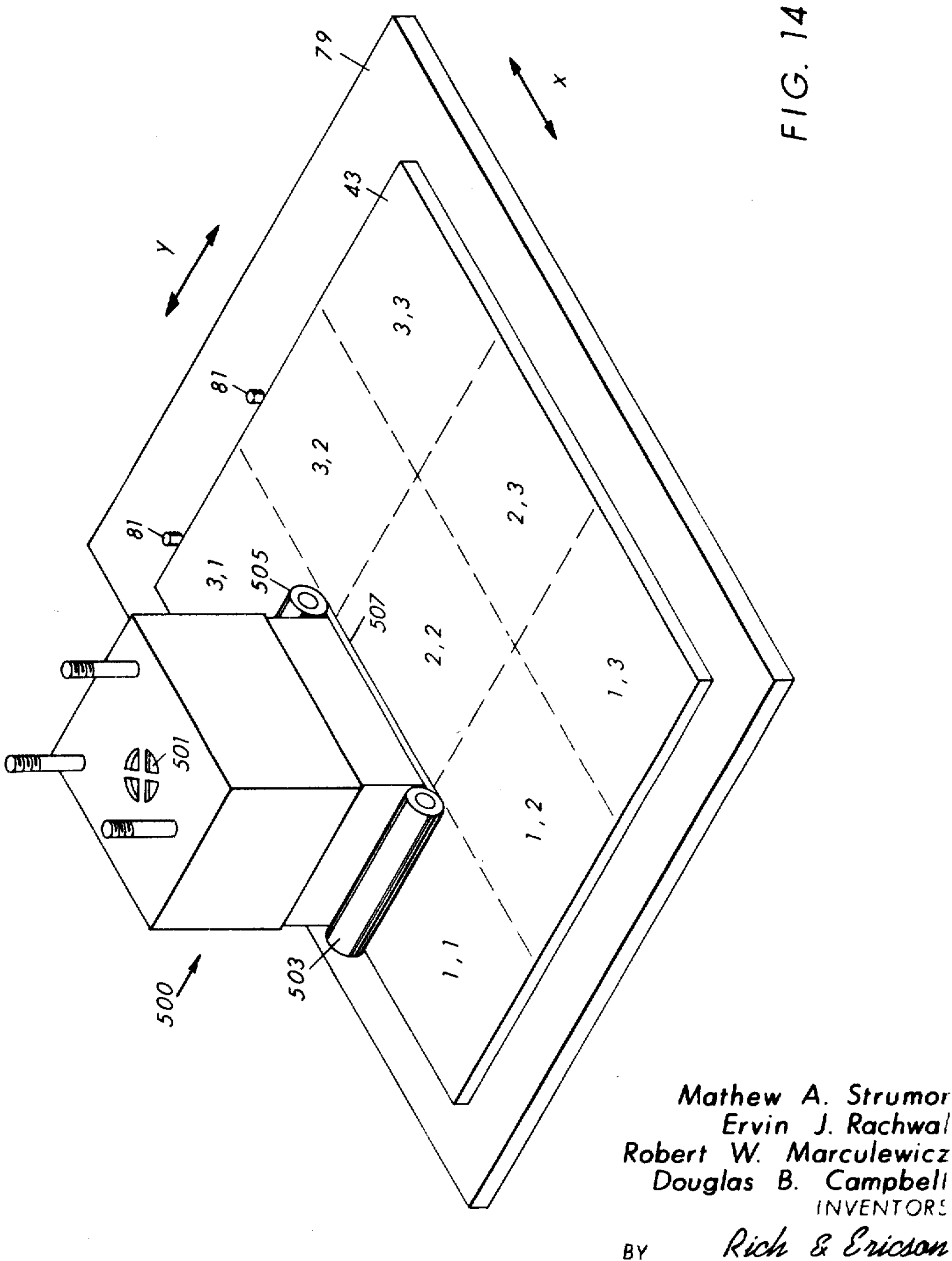
FIG. 14 is a schematic perspective sketch of a modification of the apparatus of FIG. 9.
Figure 19:
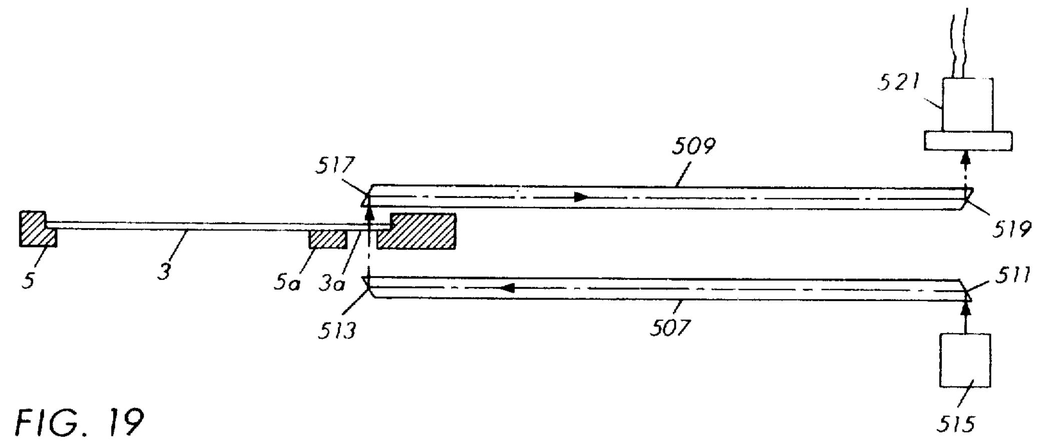
Figure 20:
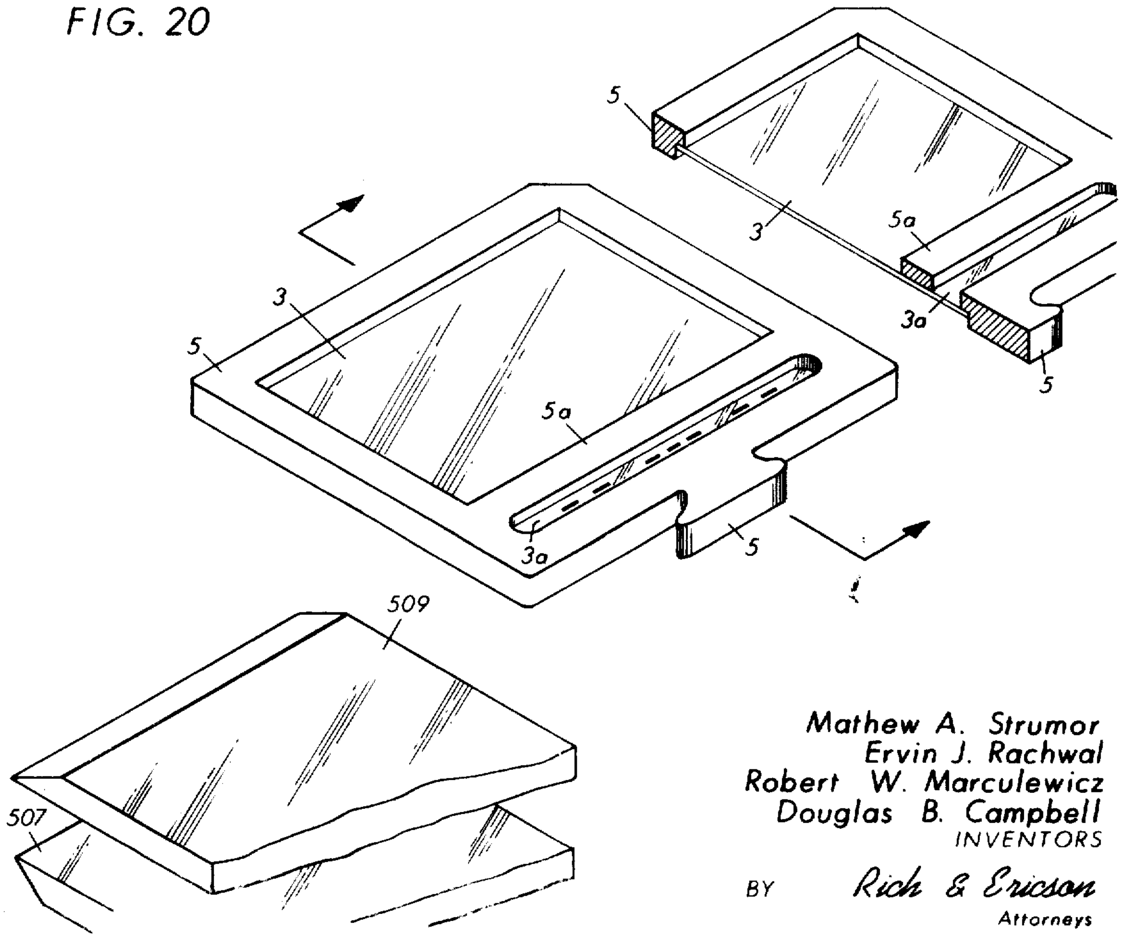

FIGS. 15, 16, 17 and 18 comprise a series of schematic sketches illustrating the process of operating the apparatus of FIG. 14 to produce a single image of a multiple-image-printing plate;

FIG. 19 comprises a schematic elevational sketch of a modification of the apparatus of our invention; and FIG. 20 comprises a schematic perspective sketch of a page plate in accordance with our invention.

Figure 1:
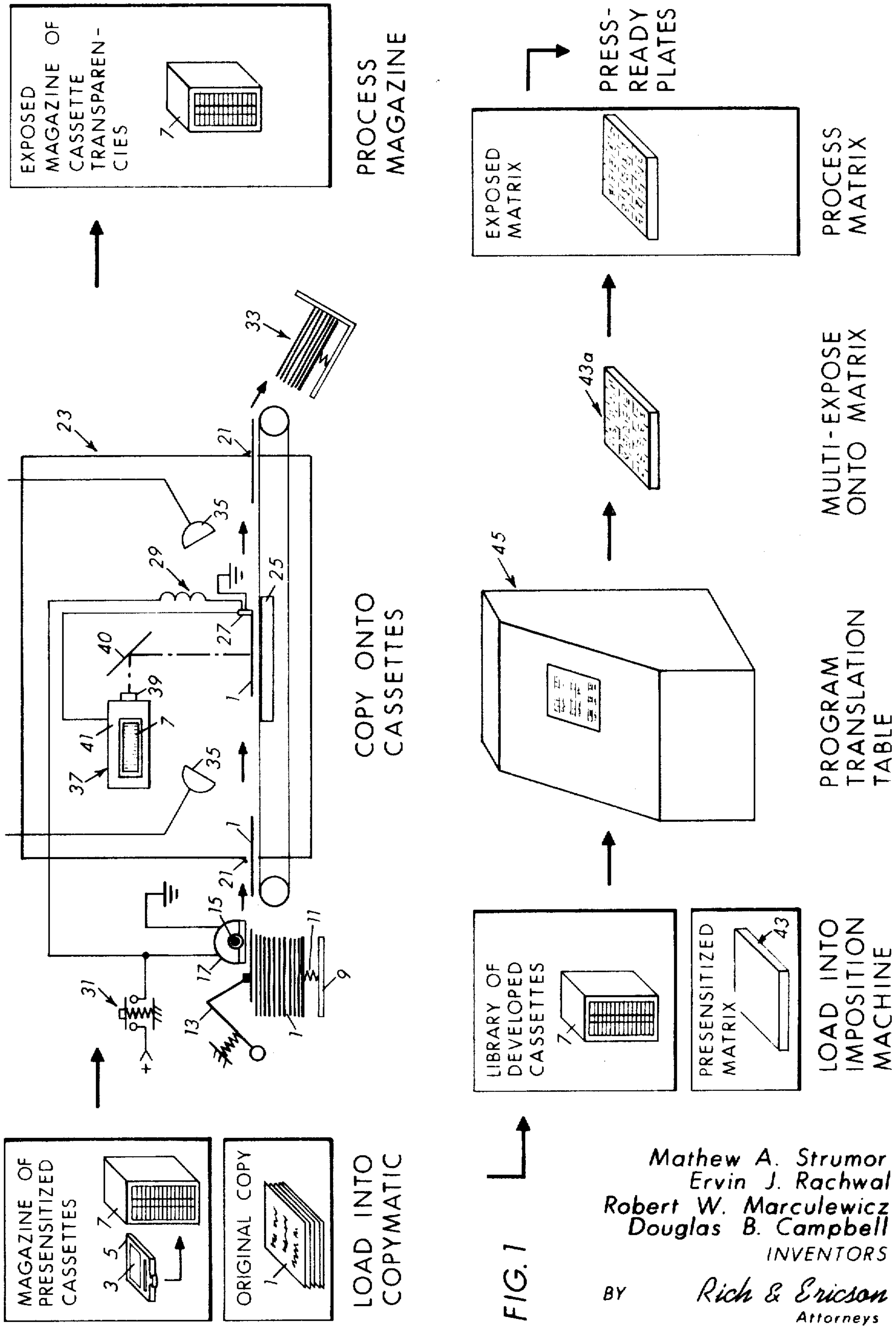

Referring first to FIG. 1, the process of our invention will next be described with reference to the particular problem of preparing plates for the printing of a book. As will be apparent to those skilled in the art, the process and apparatus are also adapted to the preparation of multiple image plates for other purposes.

First, each page of the book to be printed is photographed onto a sheet of film or the like to produce a page plate. As illustrated in the upper left-hand corner of FIG. 1, the process begins by assembling the original sheets of copy 1 in a predetermined sequence that will determine the order in which they will be imposed on the final printing plates. Alternatively, each sheet of the copy 1 may be marked with indicia, decodable by apparatus to be described, to indicate exactly where it belongs in the final scheme of things. For example, a digital code sequence may be printed on the copy sheets 1. It may be desirable for some purposes to utilize a code sequence in which there are gaps between the assigned codes to permit the interjection of adjacent codes for the purposes of editing. In any event, and except for any encoding that may be desirable to impose on it, the copy 1 is prepared in the manner conventional for the preparation of such copy for printing by conventional methods.

The individual sheets of copy 1 are to be recorded on a set of photosensitive sheets 3 each mounted in a cassette, or slide 5. The slides 5 are loaded into a cassette containing desired number of slides. At this stage, the sheets 3 are unexposed and must be maintained in darkness.

A stack of original copy 1 is loaded onto a dispenser comprising a baseplate 9 urging the stack 1 upwardly by means of a resilient spring 11. Conventional means diagrammatically indicated at 13 are provided for holding the stack 1 down against the spring 11.

A feeder roll 15 is arranged to be driven by a stepping motor 17 of any conventional design, such that when a pulse of current is supplied to the stepping motor 17 the feed roll 15 revolves to advance the sheet 1 onto a conveyor belt 19. The belt 19 is arranged to be driven by a constantly rotating motor, not shown, to carry the sheets 1 into a copying machine, to be described. Suitable light traps 21 may be provided at the entrance and exit of the housing 23 in which the photographic apparatus to be described is mounted.

The conveyor belt 19 may be of metal screen or the like, suitable for carrying the copy sheets 1 over a vacuum frame 25 of conventional construction with which they are held flat as they run into contact with a set of locating pins 27 that stop each sheet 1 in precise position for copying. The locating means 27 may be associated with a solenoid or solenoids such as 29, connected in parallel with the stepping motor 17 such that when a pushbutton 31 is depressed, the solenoid 29 is actuated to lift the pin 27 and allow the sheet 1 in position to be carried out of position, and the stepping motor is energized to advance the roller 15 to carry an image sheet under the belt 19, whereupon it will be taken into copying position. After leaving the photographing station over the vacuum frame 25, the copy sheets 1 may be deposited in a suitable storage bin schematically indicated at 33.

A pair of conventionally disposed copying lights 35 are mounted in position to uniformly illuminate the copy sheet 1 in photographing position on the vacuum frame 25. Disposed above the photographing station is a copy head generally designated 37, comprising a lens 39, a suitable housing and slide-changing mechanism 41, and other apparatus to be more particularly described in connection with the projection head detailed below.

The copy head 37 is adapted to receive a magazine 7 of unexposed sheets 3 contained in slides 5, and to advance them into position to be exposed through the lens 39 to the illuminated sheet 1 in copying position on the conveyor belt 19. In practice, as each new cassette 7 is loaded into position, the sheets 1 are successively advanced into position and photographed, on successive slides 5 that are moved into position in front of the lens 39 in a manner to be described, so that a set of exposed film sheets 3 is located in each magazine 7 in ordered positions corresponding to the sequence of the sheets 1 that have been photographed.

After a magazine 7 has been fully exposed, it is processed by conventional photographic techniques so that the result is a positive or negative transparency, depending upon the subsequent process to be carried out in a manner to be detailed below, and to be used in the preparation of the final lithographic plates. The magazine 7 and the frames of the slides 5 are preferably made of an inert material, such as a phenolic resin or the like, to facilitate liquid processing. After processing, the magazines 7 and their contents are dried, so that the result is a file of ordered transparencies each comprising a page plate.

Next, the processed magazines 7 are stored in a suitable library, in an order that is prearranged to facilitate printout, or in any addressable fashion whereby they can be recovered at random. Each magazine 7 may be associated with a single lithographic plate, or it may comprise sufficient page plates for a number of plates. In any event, associated with each magazine 7 is a presensitized matrix or matrix region, comprising in the particular embodiment described an aluminum sheet generally designated 43 on which there is a photosensitive coating of any conventional type.

The coating on the plate 43 may be a diazomaterial of the sort ordinarily used in lithography, which requires a relatively intense light to expose. Preferably, however, the coating on the plate 43 comprises a first diazocoating of the conventional variety, on which is superimposed a removable silver halide emulsion of the conventional photographic variety which is considerably more sensitive to light than the diazomaterial used for making the final plate. The silver halide emulsion is preferably exposable and developable in the conventional manner, and arranged to be dissolved, scrubbed or washed away with a suitable solvent after it has performed its function in the manner to be described.

The prepared magazine 7 of page plates, and the presensitized matrix 43, are loaded into an automatic imposition machine generally designated 45, to be described in more detail below. Briefly, in the imposition machine the presensitized matrix is exposed through the set of transparencies in the magazine 7 in an order or arrangement determined by the manner in which the printing plate is to be made up. The result is a multiply exposed matrix 43 that is then developed in one of two manners in dependence upon the nature of the sensitive coating thereon.

In particular, with a conventional diazoplate, development would be carried out in the conventional manner and the plate would then be ready for the press. As the conventional diazosystem is entirely too slow for satisfactory operation with the projection imposition apparatus of the type which we prefer, we prefer to use a composite emulsion on the plate 43 comprising a silver halide emulsion over the diazoemulsion. The silver halide emulsion can be exposed without affecting the diazoemulsion, with a limited light input, and conventionally processed to provide a multiple image photographic negative overlying the diazocoating. When this emulsion has been processed and dried, the underlying diazocoating can be exposed through it with an intense light source in the conventional manner. The photographic or silver halide emulsion is then washed or scrubbed away, and the exposed diazoemulsion developed in the conventional manner. Alternatively, the initial multiple exposure can be made on a conventional photographic film 43, with a sensitive silver halide emulsion, and the film simply superimposed on the diazoplate for contact printing.

Figures 2, 3:
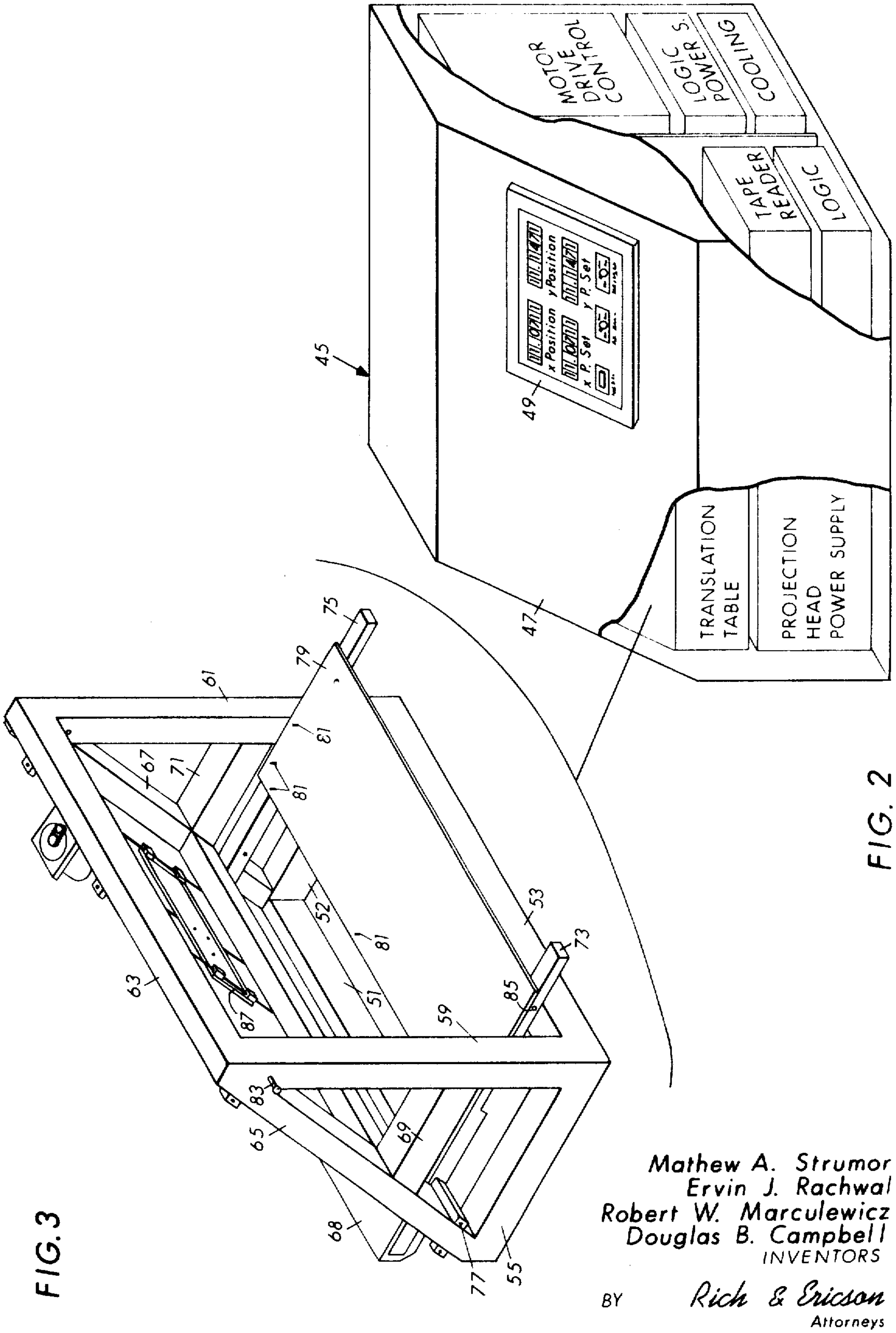
FIG. 3 is a schematic perspective sketch of the framework for the imposing apparatus forming a part of the machine of FIG. 2.

FIG. 2 shows the general arrangement of the apparatus comprising the automatic imposition machine 45 forming a part of the process and apparatus of FIG. 1. Generally speaking, there is a sloping front panel 47, comprising a portion of the housing of the apparatus, on the right-hand side of which there is arranged a control panel 49, to be described in somewhat more detail below, and on the left-hand side of which there is arranged a translation table, comprising a moveable projection head, and an imposition table, all to be described in more detail below. Various other components such as the projection head, power supply, a tape reader or other memory system, a cooling system, the motor drive control, and various logic circuit components may be arranged in the manner generally suggested in FIG. 2.

FIG. 3 shows the framework of the translation table portion of the apparatus in FIG. 2 in somewhat more detail. Referring to FIG. 3, the apparatus basically comprises an A-frame construction incorporating a rectangular base frame including longitudinal beam members 51 and 53 connected by end beams 55 and 57. A pair of uprights 59 and 61 are joined at the top by a longitudinal beam 63 and connected to the front corners of the base frame by inclined beams 65 and 67. The beams 59 and 65 are further braced by a connecting strut 69, and the beams 61 and 63 are braced by a connecting strut 71.

A pair of arms 73 and 75 are pivoted to the frame members 53 and 55 as suggested at 77. Mounted on the arms 73 and 75 is a matrix holder 79, comprising an imposition table, and provided with a set of locating pins 81 that serve to register a matrix such as a sensitized lithographic plate accurately on the support 79.

In the position of the holder 79 shown, a plate may be conveniently loaded into position and into engagement with the locating pins 81. The assembly 73, 75, 79 may then be pivoted upwardly about pivots such as 77 until a pair of locating pins 83 can be registered with cooperating holes 85 and the arms 73 and 75 to arrange the support 79 parallel to the arms 63 and 65, and to a translation table 87, to be described, that is also parallel to those arms. A counterweight 78 is preferably arranged at the ends of the arms 73 and 75 to balance the weight of the imposing table 79.

Figure 4:
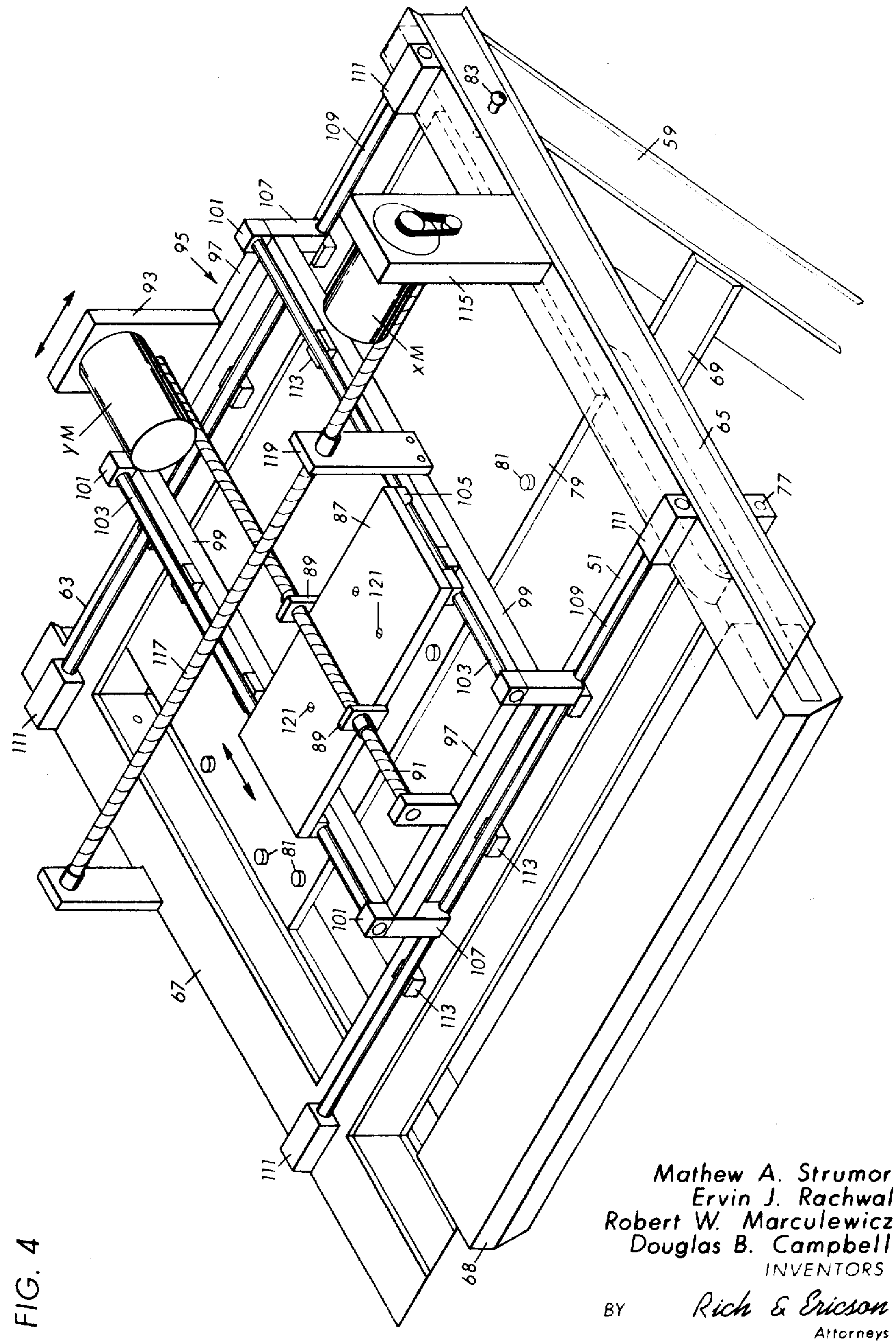
FIG. 4 is a schematic perspective sketch of details of the projection-head-positioning apparatus forming a part of the imposing machine of FIG. 2, and illustrating additional details of the apparatus of FIG. 3.

The translation table 87 is arranged to be moved to a desired location with respect to the matrix holder 79, by means to be described below in connection with FIGS. 4 through 8. Referring to FIG. 4, the translation table 87 is provided with a pair of threaded upstanding ears 89 through which a driveworm 91 passes to move translation frame 87 along a Y-axis under the control of a Y-servomotor YM. The motor YM is mounted on a frame 93 that is directly connected to a rectangular frame 95 comprising end beams 97 and side beams 99.

At the corners of the frame 95 are formed upstanding portions such as 101 in which are supported guide bars 103 cooperating with guide rails such as 105 to form the lower side of the translation frame 87 and guide the frame 87 along the Y-axis as it is positioned by the worm 91.

At the lower corners of the frame 95 are formed downwardly extending guide members such as 107 cooperating with a pair of guide rods 109 to guide the assembly comprising the frame 95, Y-servomotor YM and frame 87 along an X-axis normal to the Y-axis. The rods 109 are mounted in end supports 111 secured to the beams 65 to 67. Support blocks such as 113 may be arranged beneath the guide rods 109 and mounted on the corresponding transverse beams such as 63 and 51 at points selected to maintain alignment of the rods 109.

Positioning of the translation frame 87 along the X-axis is accomplished by an X-servomotor XM mounted in a supporting frame 115 attached to the beams 65 and driving a worm 117 engaging a threaded upstanding ear 119 attached to the frame 99. As shown in FIG. 4, the translation frame 87 is provided with a series of apertures such as 121 for mounting the projection head, to be described.

Figure 5:
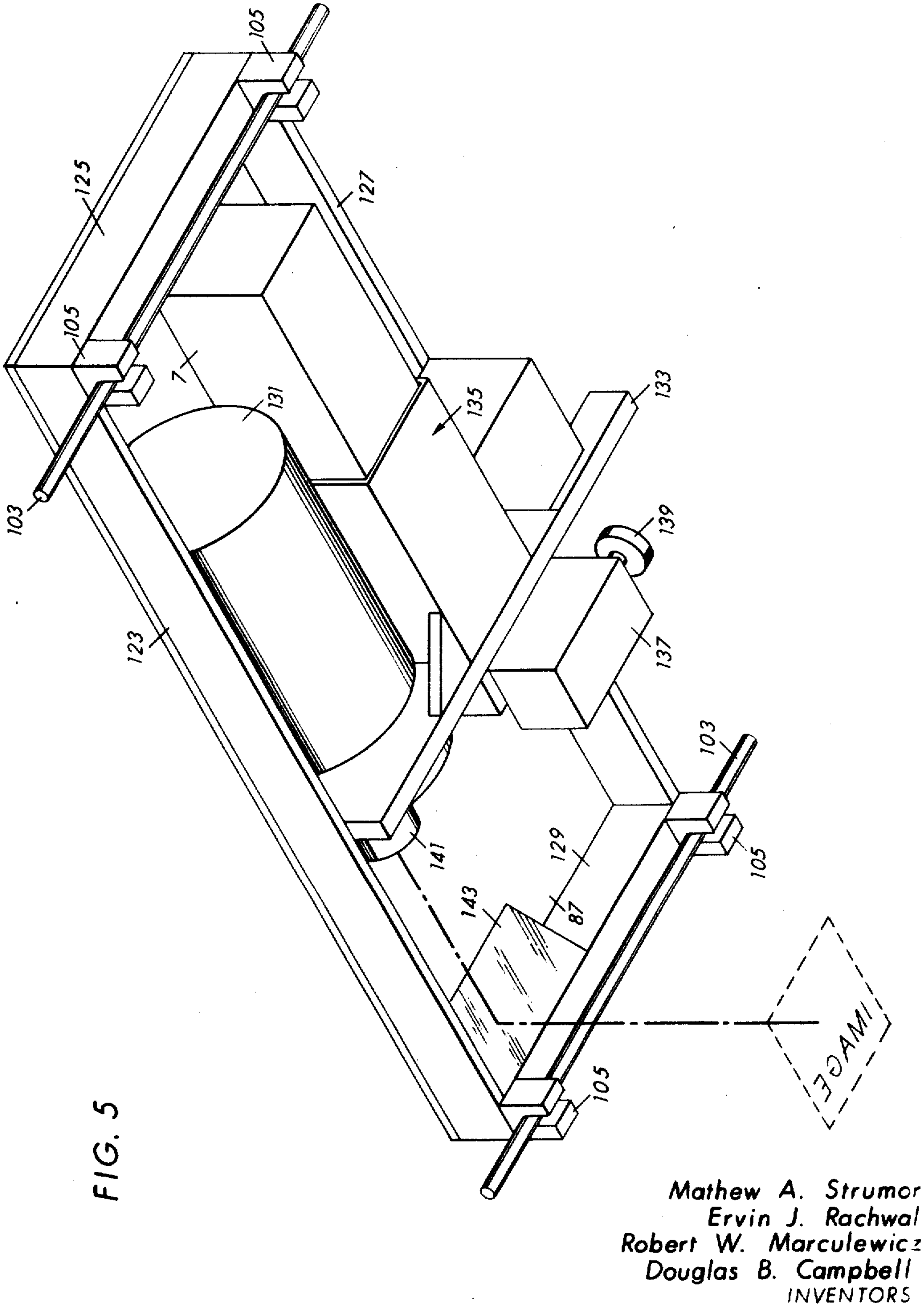
FIG. 5 is a schematic perspective sketch of a projection head adapted to be mounted on a translation frame forming a part of the apparatus of FIGS. 2, 3 and 4.

Referring next to FIG. 5, showing the underside of the translation frame 87 and the associated projection head, that apparatus will next be described. As shown, the translation frame 87 is provided with a set of sill members 123, 125, 127 and 129 which together with the interconnected frame 87 form a support for the guide blocks 105 and for the projection head apparatus to be described. Generally speaking, the projection head apparatus comprises a lamp housing 131, connected to a frame generally designated 133 that is in turn connected to the translation frame 87, and associated with a magazine receiving and slide control mechanism generally designated 135. The magazine 7 is arranged to be moved in the assembly 135 by means of a stepping motor 137, to be described below, until the last of the series of slides have been placed into position and projected on the plate 43. Thereafter, the magazine 7 can be removed by actuation of a manual control knob 139 that will retract the magazine 7 and allow it to be replaced by another magazine.

At the end of the lamp housing 137, and connected to the frame 133, is a lens 141. The lens 141 forms an image of the record sheet 3 in position, in a manner to be described, and transmits it by way of a 45° mirror 143 mounted on the translation frame 87 to direct the focused image onto the plate in position on the matrix holder 79 (FIG. 3) when the latter is in the upper position described above.

Figure 6:
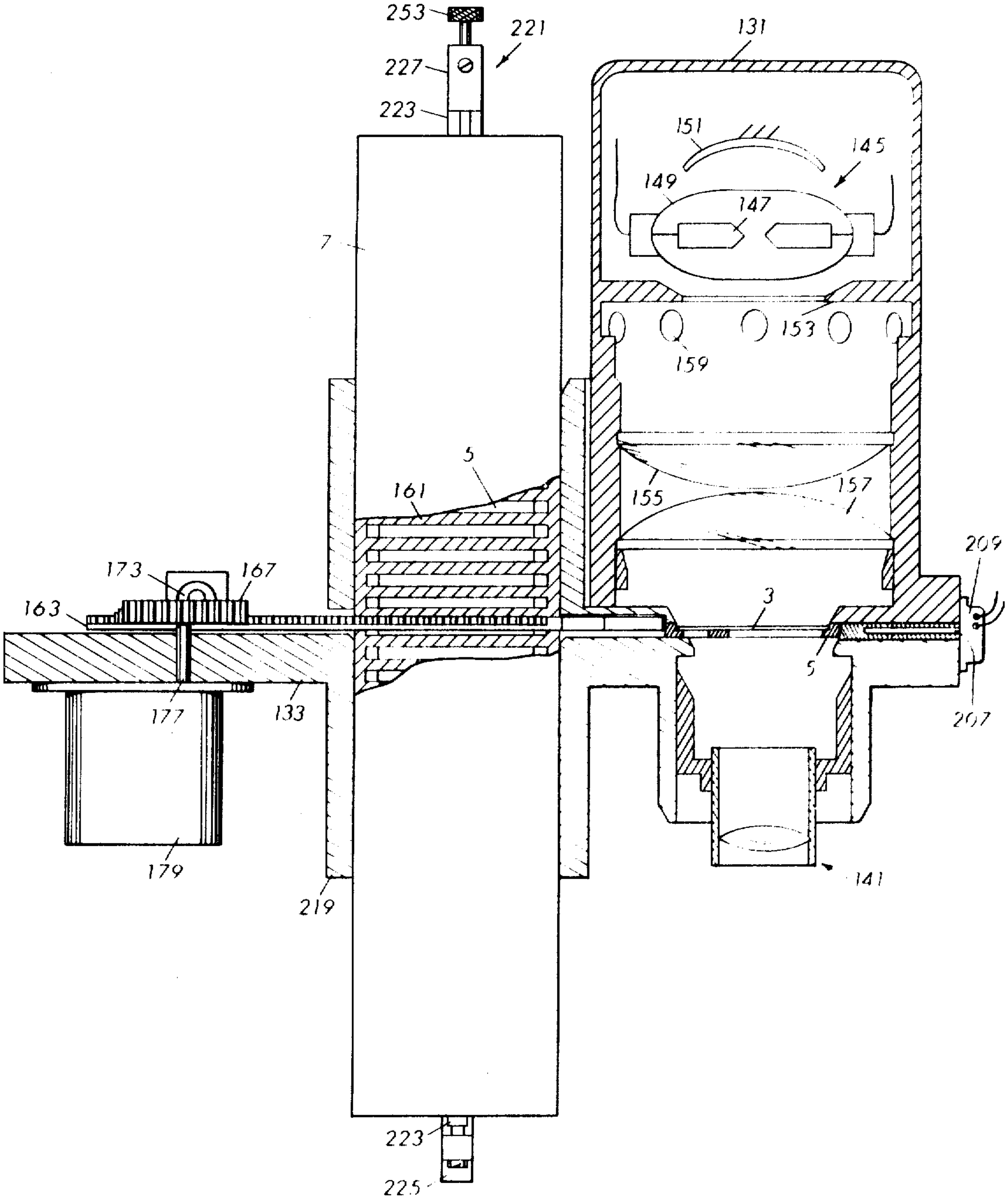
FIG. 6 is a schematic elevational view, with parts shown in cross section and parts broken away, of the projection head of FIG. 5.

Referring next to FIG. 6, we have shown the projection head in more detail. Specifically, mounted in the lamp housing 131 is a flashlamp generally designated 145 and comprising a pair of spaced electrodes such as 147 in a glass envelope 149 containing an atmosphere of xenon or the like. Arranged above the lamp 145, and supported in a conventional manner in the housing 131, is a mirror 151 arranged to reflect light from the lamp 145 downwardly. A dividing plate 153 is provided with a central aperture to pass light from the lamp 145 downwardly through a set of condensers 155 and 157 to produce an evenly illuminated field. Apertures such as 159 are preferably provided in the housing 131 for cooling by means of a fan, to be generally described below.

When a slide 5 is in the position shown, holding a transparency 3 in projection position, an image is formed by the lens 141. The lens is mounted below the slide 5 in printing position, as shown.

Figure 7:
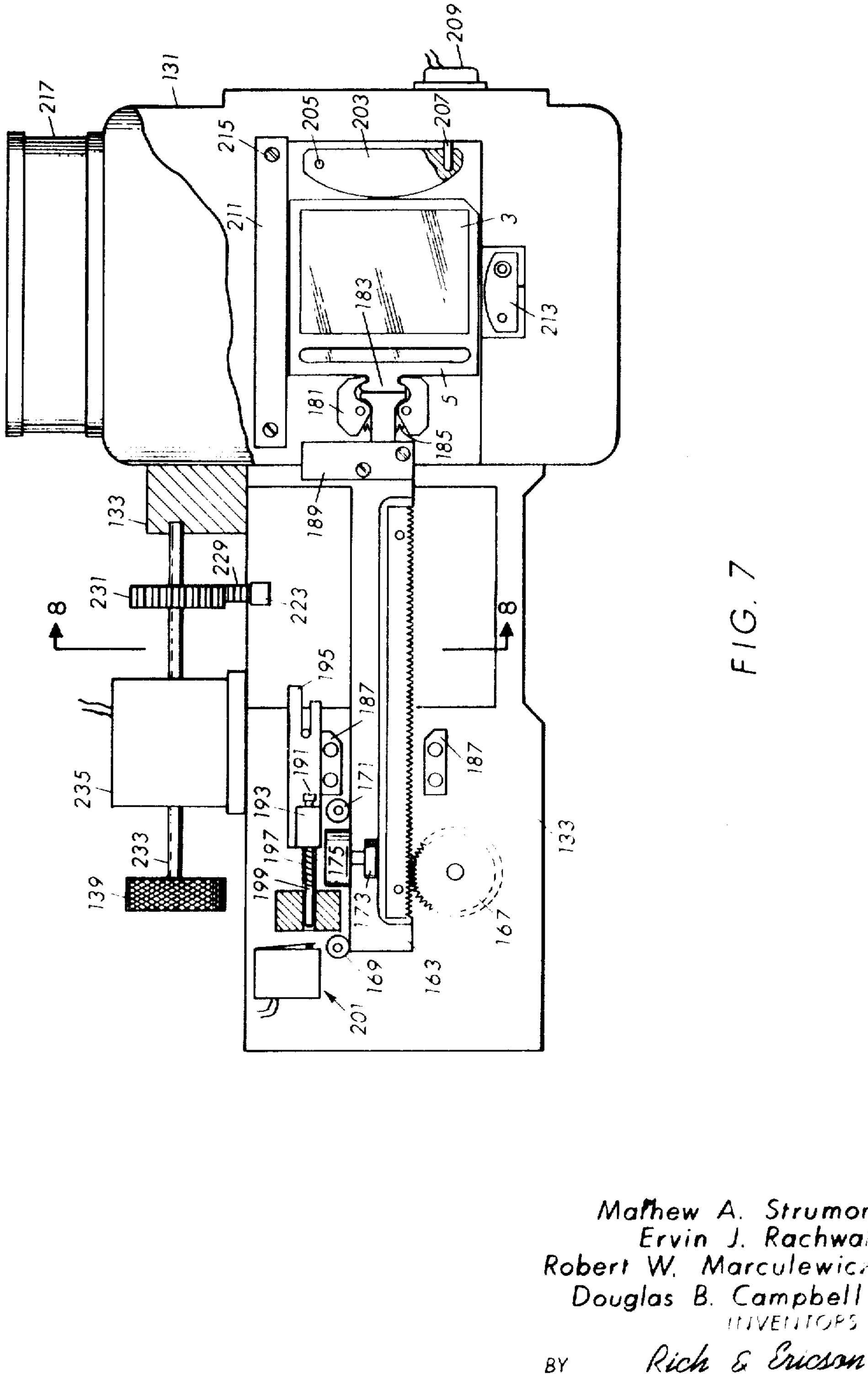
FIG. 7 is a schematic plan view of a portion of the apparatus of FIG. 6, with parts shown in cross section and parts broken away.

As indicated in FIG. 6, each magazine 7 comprises a plurality of shelves 161 between which are carried the individual slides 5 containing the page plates. The slide 5 in the proper position is arranged to be moved to the position shown above the lens 141 in FIG. 6 by a bar 163, as best shown in FIGS. 6 and 7.

On the bar 163 is mounted a rack 165. The rack 165 cooperates with a drive pinion 167, a pair of side guide rollers 169 and 171, and a top guide roller 173, the latter being journaled in a suitable support 175, to move the bar 163 back and forth in a manner to be described. As shown in FIG. 6, the pinion 167 is connected through a drive shaft 177 to a suitable slide change motor 179 mounted on the frame 133.

At one end of the bar 163 are mounted a pair of frame-engaging fingers 181 that are pivoted to the bar 163 and are urged into engagement with a cooperating gear 183 provided on each frame 5 by resilient means such as the spring 185 shown. When the bar 163 is moved to the left in FIG. 7, the fingers 181 engage a pair of cams 187 mounted on the frame 133 to disengage the fingers from the slide frame 5 and thereby release it in storage position in the cassette 7.

The bar 163 carries an arm 189 affixed thereto. When the bar is retracted, the arm 189 engages an adjustment screw 191 formed on a block 193 that has an extension 195 formed to register between the shelves 161 and the cassette 7 and exactly position the cassette for proper transfer of the slides 5. As the bar 163 moves to the left, it engages the screw 191 and moves the block 193 backwards against a spring 197. A pin 199 secured to the block 193 engages and operates a "slideout" limit switch 201 in the extreme leftward position of the bar 163.

As the bar moves into the position shown in FIG. 7, or to the right in FIG. 7, carrying a slide 5, the frame is urged into engagement with a cam 203, pivoted to the frame as indicated at 205, and engaging an actuating pin 207 that operates a "slide in" limit switch 209 in the position of the slide 5 shown in FIG. 7.

Lateral registration of the frame 5 in the lamp housing 131 is controlled by a guide plate 211 fixed to the frame on one side, and a spring-loaded cam 213 at the other side as indicated in FIG. 7. Initial registration of the guide 211 is attained by means of conventional adjusting screw 215 cooperating with slots in the guide plate 211.

As indicated at 217 in FIG. 7, the apparatus is preferably provided with a cooling fan to force air through the lamp housing 131 and thereby remove the heat dissipated in the course of operating the lamp 145.

Figure 8:
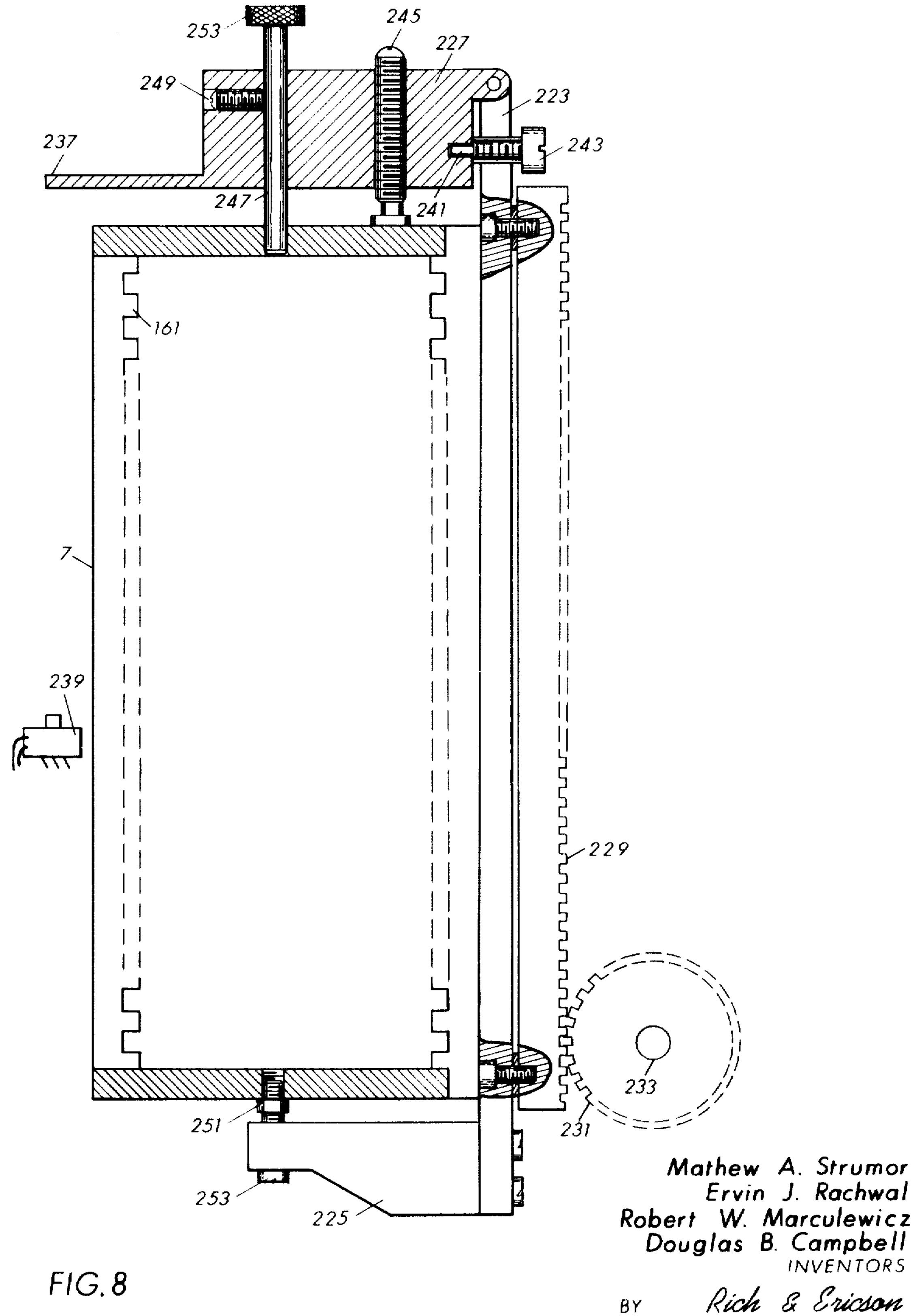
FIG. 8 is a fragmentary view of the apparatus of FIG. 7, taken substantially along the lines 8—8 in FIG. 7, with parts shown in cross section and parts broken away.

The cassette 7 is guided in a frame portion 219 for movement under the control of an attached supporting assembly generally designated 221 and comprising a longitudinal bar 223 to which is secured a bottom block 225 and a top block 227. As best shown in FIGS. 7 and 8, at the back of the bar 223 is mounted a rack 229 adapted to be driven by a pinion 231 fixed to a drive shaft 233.

The shaft 233 is journaled at one end in a portion of the frame 133, and is connected at the other end to a solenoid-operated incremental stepping device 235, of any conventional construction, arranged to be supplied with a pulse of current to rotate the pinion 231 by a selected angular increment such as 30°. Each such pulse will drive the pinion 231 in the same direction, moving the cassette 7 downwardly in FIG. 6, until at the end of the movement of the cassette, a projection 237 on the block 227 (shown in FIG. 8) engages a lower limit switch 239 to produce a signal that all the slides in the magazine have been exposed. When it is desired to remove the magazine, a manual knob 139, shown in FIG. 7, is operated to move the magazine up and out of position.

As shown in FIGS. 6 and 7, the bar 223 is pivoted at the top to one corner of the end block 227. The block 227 is secured in that position when the cassette 7 is in operating position by means of a pin 241 formed at the end of a manually operable screw 243 threaded in the bar 223. A first adjusting screw 245 is threaded into the block 227 and engages the top of the magazine 7. An adjustable locating pin 247 is adjustably secured to the block 227 by means of a setscrew 249, and engages a suitable recess in the top of the magazine 7 to further secure it. At the bottom of the magazine 7, a phasing pin 251, connected to a setscrew 253, engages a suitable recess in the magazine 7 so that the exact registration of the shelf 161 in the magazine 7 can be made with respect to the lamp housing 131.

When it is desired to remove a magazine and replace it with another one, the screw 243 in FIG. 8 is backed off. The knurled knob 253 formed on the pin 247 is then grasped so that the block 227 can be swung up, allowing the magazine 7 to be removed.

Figure 9:
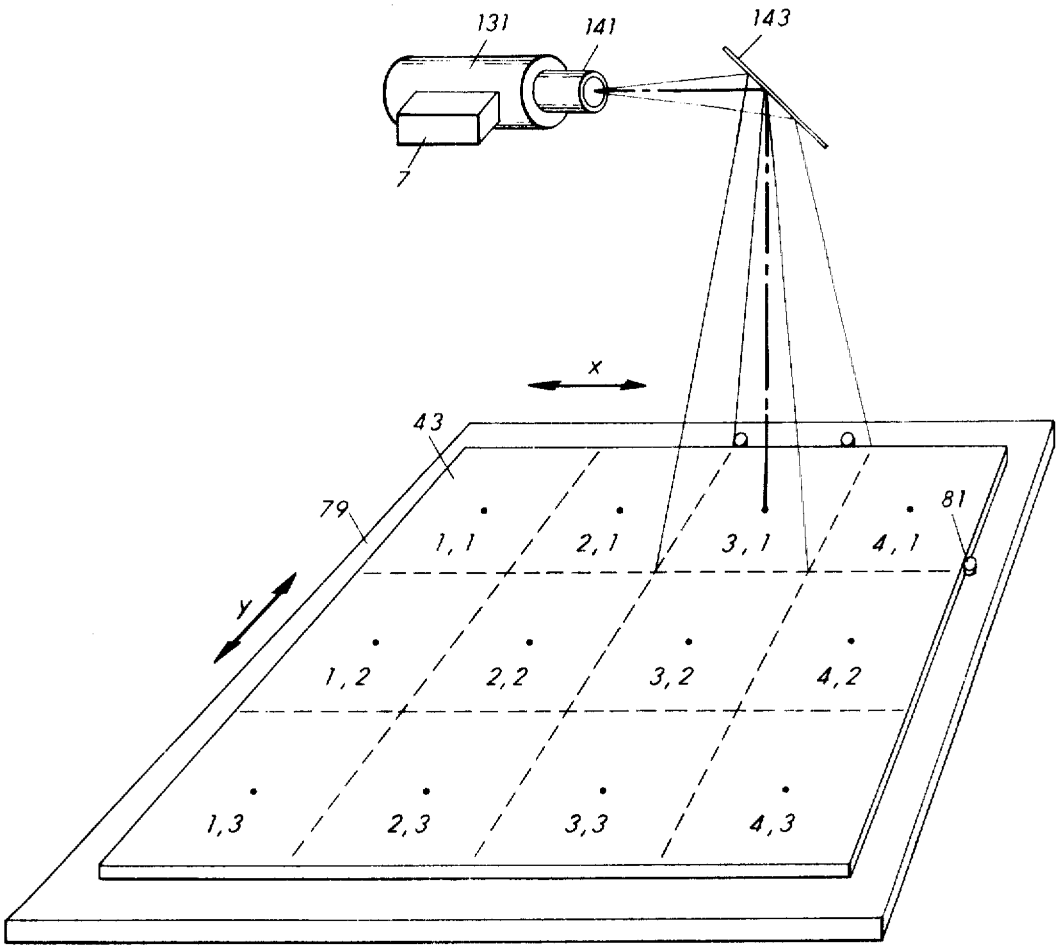
FIG. 9 is a perspective sketch illustrating the use of the apparatus of our invention in preparing a multiple-image-printing plate.

Referring next to FIG. 9, we have shown schematically the manner in which the successive exposures are made on a plate 43 as the projection head comprising the magazine 7, lamp housing 131, associated lens 141 and mirror 143 are stationed at different points above the plate 43. For the purposes of imposition, the plate 43 is considered as a matrix of page positions each defined by coordinates X and Y with reference to page centers. As will appear, these matrix locations may be adjusted as desired as they are not necessarily or even desirably in one-to-one correspondence with the set of adjusted positions that can be provided. In other words, the distance between the centers 1,1 and 2,1 on the plate 43 in FIG. 9 may be any desired number of available increments of movement of the projection head with respect to the plate 43.

As will appear, each cell in the matrix can be exposed sequentially, as from left to right in the top row in FIG. 9, then from right to left in the middle row, then from left to right in the bottom row. Alternatively, any other sequence of exposures can be made, by means to be described.

Figure 10:
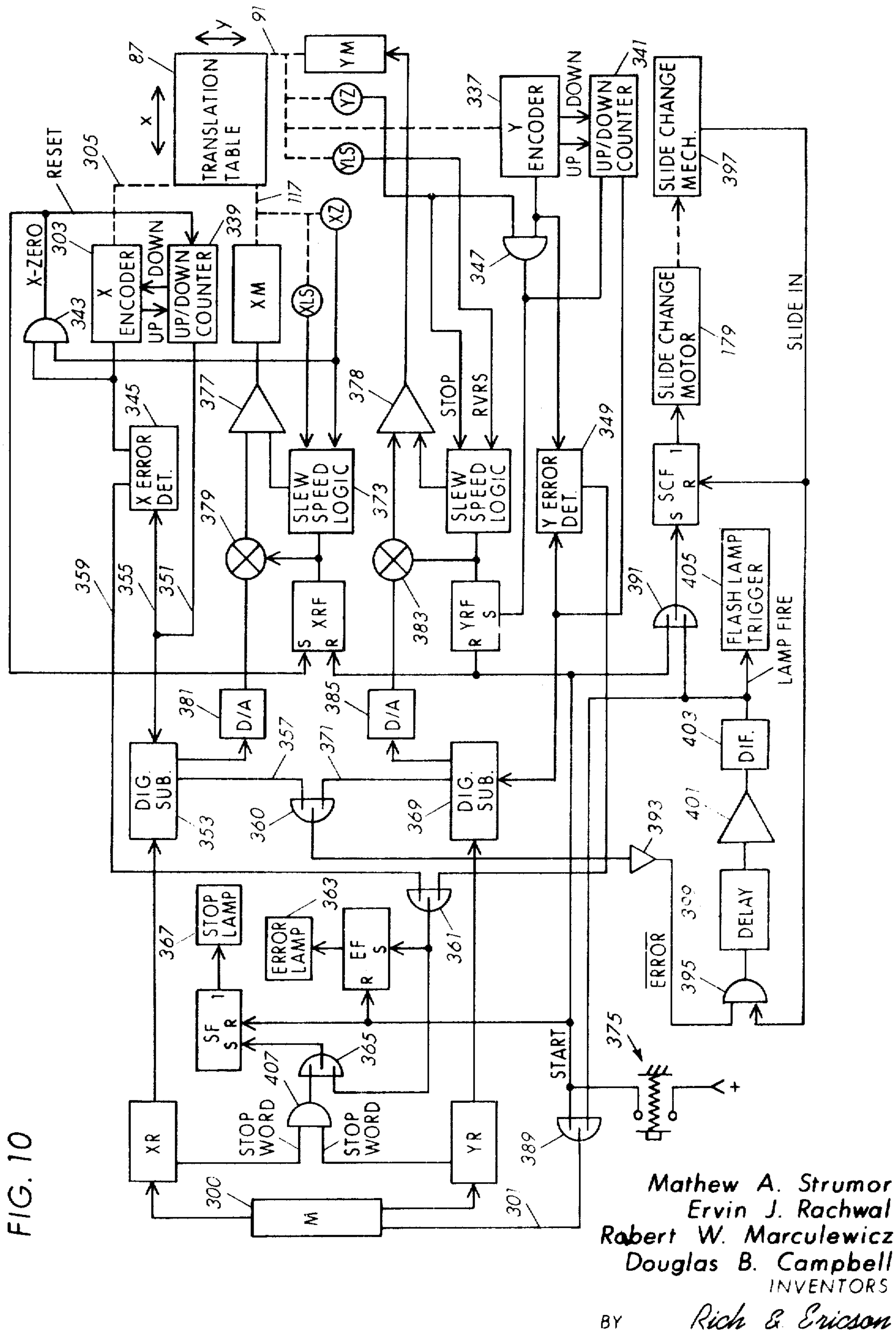
FIG. 10 is a schematic wiring diagram of a control system for the apparatus of FIGS. 2 through 8.

Fig. 10 shows control apparatus for the imposition machine of FIGS. 2 through 8, for directing it through the sequence of operations required for preparing a plate. Referring to FIG. 10, the imposing sequence to be followed is determined by a suitable memory 300. The memory may be any conventional device from storing a sequence of X- and Y-addresses corresponding to page centers on the plate 43 where exposures are to be made. For example, the sequence of addresses may be encoded on paper tape, and a tape reader used as the memory 300. Such a memory can readily be arranged, by means familiar to those skilled in the art, to supply a set of new X- and Y-addresses each time a pulse is applied to it to advance it to the next tape reading position. Alternatively, a core plane memory can be employed, or various other forms of registers suitable for the storage of a sequence of address locations, and their ordered production upon the application of suitable stepping pulses.

In one desirable form of the apparatus, the memory 300 may comprise a pair of counters together with conventional gate circuits to arrange the counters to be incremented by a number of steps at a time in dependence upon the setting of thumb switches connected with the operator's console (FIG. 2). In other words, and for example, for 9×12-inch pages an X-counter can be arranged to step an amount equivalent to 9 inches, and the corresponding Y-counter an increment corresponding to 12 inches. Preferably, for a typical printing sequence, the X-counter for example, might be arranged to step a suitable increment each time a new address was requested, and the Y-counter could be arranged to step once each time the X-counter had reached an end-of-line position. Whatever the arrangement, the memory 300 is arranged to supply an X-address to an X-register XR and a Y-address to a conventional register YR, each time a pulse is applied to the memory 300 over a line 301. One of these addresses may remain constant while the other is stepped through a series of increments, as just suggested. Alternatively, for some purposes it may be desirable to step both addresses to jump from cell to cell in a random fashion, as for editing. The X- and Y-registers may be conventional digital registers each capable of holding a digital indication, for example, in binary coded decimal form, of sufficient precision to match the precision of the servomechanism to be described.

The connection of the X-servomotor XM to the shaft 117 driving the translation table 87, and the corresponding connection of the Y-servomotor YM to the shaft 91, are indicated schematically in FIG. 10, although reference may be had to FIG. 4 to show the mechanical construction intended.

Since the X- and Y-axis controls are symmetrical, the control circuits for the servomotors are the same. Specifically, the X-axis servomechanism comprises an X-encoder 303 that may be any suitable conventional digital shaft encoder connected by means suggested in 305 to the translation table 87 to produce a series of shaft angle marker pulses. The encoder is preferably bidirectional, such that for each increment of movement of the shaft 117 in one direction, an "up" pulse is produced by the encoder 303, and for each corresponding increment in the opposite direction, a "down" pulse is produced. These pulses may be produced at, for example one one-thousandth of an inch increments of movement of the table 87. For each selected unit of movement, such as that corresponding to one revolution of the shaft 117, an index pulse is produced by the X-encoder 303.

Figure 11:
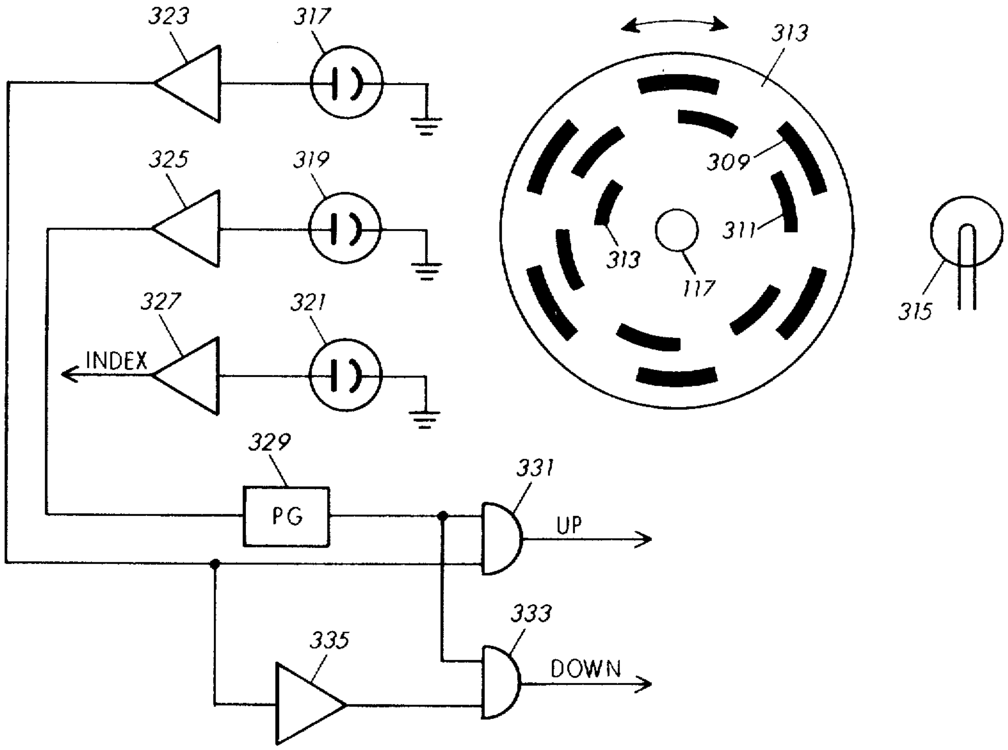
FIG. 11 is a schematic wiring diagram of a portion of the apparatus of FIG. 9.

FIG. 11 shows one suitable form for the encoder 303, which is also a suitable construction for the Y-encoder to be described. As shown, the encoder may comprise a transparent disc 307 connected to rotate with the corresponding shaft such 117 and provided with a series of opaque regions in three series: 309, 311 and 313. The regions 309 may be spaced all about the periphery of the disc 307, as may the regions 311. The regions 309 and 311 are essentially arranged 90° out of phase, for purposes to appear. Only one region 313 need be provided on the disc 307, to produce the "index" pulse described above. The opaque portion 309, 311 and 313 cooperate with a lamp 315 on one side of the disc 307, and with a series of photocells 317, 319 and 321 on the other side, to produce signals for operating amplifiers 323, 325 and 327 to produce control pulses.

Figure 12:
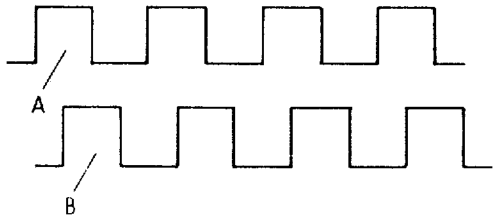
FIG. 12 is a graph showing the relationship between pulses generated by the apparatus of FIG. 10.

The amplifier 323 produces a pulse train A as shown in FIG. 12, and the amplifier 325 produces a pulse train B that is 90° out of phase with the pulse train A. One of these pulse trains is used to provide a level, and the other to provide a pulse, the two being gated together to determine the direction in which the disc is moving.

As shown, the output of the amplifier 325 is connected to a pulse generator 329 to produce a pulse at the leading edge of each B-pulse. That pulse is applied to input terminals of two AND-gates 331 and 333. The output of the amplifier 323 is applied directly to one input terminal of the AND-gate 331, and through an inverter 335 to the other AND-gate 333. By that arrangement, if the disc 307 is rotating in one direction, the gate 331 will be able to produce a pulse each time the pulse generator 329 produces a pulse, and if it is rotating in the other direction, the gate 333 will produce a pulse. These pulses serve to energize the up/down counters to be described in connection with FIG. 10. The index pulse is produced directly by the amplifier 27.

As indicated in FIG. 10, the up and down counting pulses provided by the encoder 303, and the corresponding Y-encoder 307, are applied to reversible up/down counters 339 and 341, respectively. The index pulse produced by the encoder 303 is applied to the input terminal of an AND-gate 343, and also to an X-error dector 345. The index pulses from the Y-incremental encoder 337 are applied to one input terminal of an AND-gate 347, and also to a Y-error detector 349.

Signals representing the state of the up/down counter 339 are supplied over a set of lines indicated at 351 to the error detector 345, and to a digital subtractor 353. The connection 355 to the error detector 345 may simply comprise a set of one or more of the lower ordered bits of the counter contents 339, as will appear. The full count of the counter 339 is compared by the digital subtractor 333 with the contents of the register XR to produce an X-error signal on a lead 357 when the contents of the X-register XR do not agree with the contents of the up/down counter 339.

The X-error detector 345 may simply comprise an AND gate enabled by the index pulse produced by the encoder 303 to produce an output error signal on a lead 359 if the selected lower ordered bits of the up/down counter contents are not zero at index pulse time, as they should be if there has been no error in positioning or detection. If there is such an error detected, the signal on the lead 359 is applied through an OR-gate 361 to set an error flip-flop EF and cause an error lamp 363 to be lit. The output of the gate 361 is also applied to an OR-gate 365 to set a stop flip-flop SF and cause a stop lamp 367 to be illuminated.

The Y-axis servomechanism components corresponding to those just described may be of identical construction. In short, the up/down counter 341 is connected to a Y-error detector 349 and to a digital subtractor 369 that compares the contents of the register 341 to the contents of the Y-address register YR. When there is a discrepancy, the digital subtractor 369 produces a Y-error flag on a lead 371 that is applied to the gate 360 to perform the same functions as the X-error flag on the lead 357 and described above.

Connected to the X-translation shaft 117 are a pair of switches XLS and XZ. The switch XLS is open when the translation table reaches zero on the X-axis and continues to stay open for a short distance of permissible travel of the table below the zero index point. The XZ switch opens to produce a signal pulse only when the shaft 117 is at the zero data point on the X-axis. Similarly, switches YLS and YZ are provided and connected to the Y-axis translation shaft 91.

The switch XLS provides one input to a X-slew-speed logic circuit 373. Another input is provided by a flip-flop XRF that is arranged to be set when the gate 342 produces a logic one output, and to be reset when a start pushbutton 375 is momentarily depressed. The slew-speed logic circuit 373 acts when the flip-flop XRF is set to apply a small drive signal to a X-axis servomotor amplifier 377 that will be of the proper sense to drive the X-servomotor XM to set the translation table towards zero on the X-axis, unless the switch XLS is open. If the switch XLS is open, indicating that the table is already at or below the zero position, the slew-speed logic circuit 373 will provide an opposite signal to the servoamplifier 377 to move the translation table 87 up toward zero on the X-axis. At the zero index point, the switch XZ is closed to cause the slew-speed logic circuit 373 to be shut off. Identical apparatus is provided for the Y-axis and it will not be described in detail.

A second input to the servoamplifier 377 is at times supplied through an electronic switch 379 from a digital-to-analog converter 381 that responds to the output of the digital subtractor 353 to provide an analog signal to the amplifier 377 indicating the X-error remaining to be corrected. The indicated error is corrected by moving the table 87 along the X-axis until its position agrees with the contents of the X-register XR. The switch 379 is arranged to be closed when the flip-flop XRS is reset. Similar apparatus, comprising an electronic switch 383 controlled by a Y-flip-flop YRF and a digital-to-analog converter 385, is provided for the Y-axis.

The start pushbutton 375 operates as described to reset the flip-flops XRF and YRF, and also reset the flip-flops SF and EF. In addition, the start pulse is applied through an OR-gate 389 to produce a memory advance pulse on the lead 301, and is also applied to an input terminal of an OR-gate 391. The latter operates a slide change mechanism to be described.

An AND-gate 407 is provided to detect "stop words" located in the X-register XR and in the Y-register YR. These words may be detected by conventional gates associated with the registers, and may be loaded into the registers to indicate that the end of the printing sequence has been completed and that a new magazine should be loaded.

When there is a logic zero signal on both of the leads 357 and 371, causing the gate 360 to produce a logic zero output signal, an inverter 393 produces a logic 1 output signal and enables an AND-gate 395. A second input to the gate 395 is provided by the slide change mechanism, generally indicated at 397 in FIG. 10, that produces an enabling signal when the "-slide in" limit switch 209 is actuated. When the gate 395 produces a logic one output pulse in response to logic one inputs at both input terminals, a delay circuit, such as a delayed one-shot multivibrator or the like, is actuated to produce an output signal at the end of a predetermined delay, provided to permit the apparatus to stop hunting if it is doing so after reaching an imposition station. After that time has expired, a driver amplifier 401 produces an output pulse that is applied through a differentiator 403 to produce a lamp-firing pulse that actuates the lamp trigger circuit generally designated 405 and comprising conventional means for supplying current to the flashlamp 145 in FIG. 6. At the same time, the lamp fire pulse is supplied to the gates 391, 389 to advance the memory contents 300 and to start a new slide change cycle.

Figure 13:
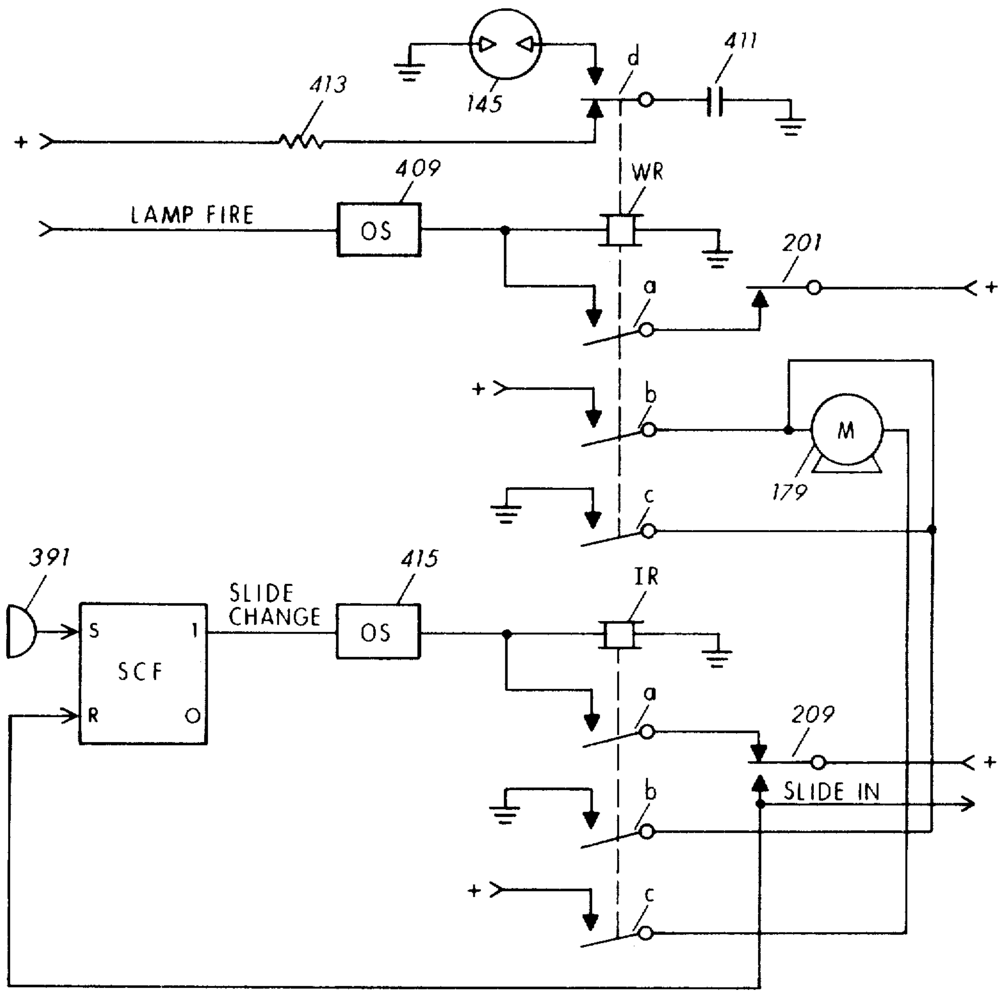
FIG. 13 is a schematic wiring diagram of the slide change mechanism forming a portion of the apparatus of FIG. 9.

FIG. 13 shows the details of the slide change apparatus. Referring to FIG. 13, the lamp fire signal produced when the differentiator 403 produces its output pulse is applied to a suitable pulse generator, here shown as a one-shot multivibrator 309, that produces an output pulse serving to pick up a withdrawal relay WR. As soon as the relay WR picks up, it is held up over a stick circuit completed over its front contact *a* and a contact of the limit switch 201 that is closed when the slide is out of the printing position, and opened when it reaches the printing position. At the same time, front contacts *b* and *c* of the relay WR close to complete an energizing circuit for the slide change motor 179, causing it to move in the proper direction to advance the slide into position. Simultaneously, front contact *d* of the relay WR is closed to break a charging circuit for a capacitor 411 that has been established through a resistor 413 from a suitable source of power, and to transfer the capacitor into circuit with the flashlamp 145 and cause the exposure to be made.

Since the flash operation is quite rapid compared with the operation of the slide change motor 179, the exposure is made before the motor 179 begins to move the slide in position out of position. The relay WR remains up until the slide bar 163 is in the full leftward position in FIG. 7, at which time the limit switch 201 will be opened.

When the gate 391 next produces a logic 1 pulse, the slide change flip-flop SCF will be set, producing an output level that triggers the one-shot multivibrator 415, causing an insertion relay IR to be picked up. When picked up, the relay IR is held over its front contact *a* and a contact of the limit switch 209 that is closed except when the slide is fully to the right in FIG. 7.

Front contacts *b* and *c* of the relay IR complete an opposite energizing circuit for motor 179, causing the next slide to be moved into printing position. When the slide reaches printing position, the switch 209 opens and closes a second contact, to produce the "slide in" signal used to enable the gate 395 in FIG. 10, and also resets the slide change flip-flop SCF.

The operation of the apparatus will next be described with reference to FIGS. 10 and 11 and 13. First, assume that the apparatus is at rest with the translation table 87 at some XY-location. Next, assume that the start pushbutton 375 in FIG. 10 is momentarily depressed. The gate 389 will then apply a pulse to the memory 300, causing the first X- and Y-addresses to be loaded into the X- and Y-registers XR and YR. At the same time, resetting pulses are applied to the flip-flops SF, EF, XRF and YRF and the gate 391 will produce a pulse to cause the first slide to be advanced to the printing position by operation of the circuit in FIG. 13 just described.

When the first slide is in position, the slide in signal in FIG. 13 will be produced, enabling the gate 395. However, unless the current X- and Y-addresses for the translation table happen to agree with the current contents of the registers XR and YR, the gate 395 will not produce an output pulse because at least one of the error flag conditions applied to the gate 360 by the subtractors 353 and 369 will be present.

In the reset states of the flip-flops XRF and YRF, the switches 379 and 383 will be open, and the slew-speed logic circuits will apply signals to the servoamplifiers 377 and 378 to drive the translation table towards the zero-zero position. When that position is reached, for the X-axis the XZ-switch will be closed to shut off the slew-speed logic circuit 373. When the YZ switch is closed, indicating that the Y-position is also zero, the Y-slew-speed logic circuit will be shut off. At the exact X- and Y-zero points, with the switches XZ and YZ open, the gates 343 and 347 produce zero marker pulses in response to the index pulse produced by the corresponding shaft encoders 303 and 337. In general, those zero marker pulses will not be produced at the same times.

Assuming that the X-zero marker signal is produced first, the X-flip-flop XRF will be set to close the switch 379 and connect the digital-to-analog converter 381 to the servoamplifier 377 to begin positioning of the apparatus to the new X-address. As soon as the Y-zero index mark is detected, the gate 347 will set the Y-flip-flop YRF to close the switch 383 and begin the positioning of the table 87 along the Y-axis. Of course, those operations could occur simultaneously, or in the inverse order of that just described.

As soon as the desired position of the translation table has been reached, both of the subtractors 253 and 369 will produce zero output signals, so that the gate 395 will be enabled through the gate 360 and the inverter 393. When that occurs, with the slide in signal applied to the gate 395, the gate 395 will actuate the delay circuit 399. After the delay provided to allow hunting to die down, the lamp fire pulse will be produced and the slide in position will be exposed. At the same time, the apparatus in FIG. 13 will begin withdrawal of the slide, and the gate 389 will advance the memory contents 300 to load new X- and Y-addresses into the registers XR and YR. The process will continue until stop words are encountered in both of the registers XR and YR, causing the stop flip-flop SF to be set and light the stop lamp 367. That indication shows the operator that it is time to replace a magazine.

Should an error be detected by either of the error detectors 345 and 349, resulting from the detection of an improper code combination in one of the up/down counters at the index point, the stop flip-flop SF will be set and in addition the error flip-flop EF will be set to light the error lamp 363. That will indicate an abnormal condition to the operator, who can then determine whether or not corrective action is required, and, when it has been taken, or if none is required, reset the apparatus by pressing the start pushbutton 375.

We have described the preceding embodiment of our invention as adapted for use with discrete page plates comprising sets of frames each containing a single page transparency. However, it is within the scope of our invention in its broader aspects to employ roll film on which a series of images is recorded. For that purpose, the slide-changing apparatus in FIG. 6 and 7 will be replaced by a roll film advance mechanism moving in one direction to carry the film past the printing station, in page increments, to a takeup roll.

The projection apparatus described above is quite satisfactory when the sheet 43 on which the multiple image is recorded comprises either a sheet of conventional photographic film, or a printing plate of the type described above in which the base substrate of aluminum has a first conventional diazocoating on which there is superimposed a silver halide emulsion that can be easily exposed to record an image prior to its transfer to the diazocoating.

For use with conventional diazolithoplates, the process and apparatus illustrated in FIG. 14 is preferred. Referring to FIG. 14, the same imposing table 79 carrying locating pins 81 for registering a plate 43 in imposing position is employed. However, the apparatus of FIG. 3 is modified by attachment to the translation table 87 of a contact printing head generally designated 500 in FIG. 14 which is positioned over the table 79 in exactly the same way as the projection head, except that it has one additional movement. That is to say, it is arranged to be raised and lowered. In the lowered position, it is essentially in contact with the surface of the plate 43 so that a contact exposure can be made. In the raised position, it clears the plate 43 sufficiently so that it can be moved to the next imposing position. To ensure that the head is in position before an exposure is made, a down limit switch may be incorporated in the gating circuit for the exposure control apparatus in FIG. 10; i.e., as an additional input to gate 395.

The head 500 includes a conventional contact printing lamp of intense light output and is preferably arranged with cooling vents 501 so that an internal cooling fan can dissipate the heat generated by the lamp. At the base of the printing head is a roll film mechanism comprising a supply roll 503 and a takeup roll 505 that may be arranged to be advanced to carry an appropriate sheet of film 507 from one frame position to the next, by essentially the means described above in connection with the slide change mechanism, except that the movement is unidirectional and that a limit switch would be provided to signal when the last exposure had been made.

Figure 16:
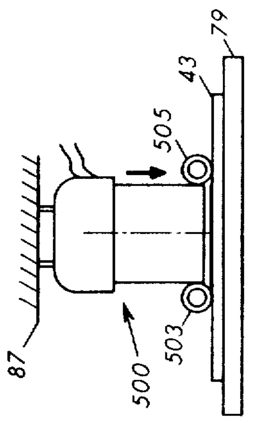
Figure 18:
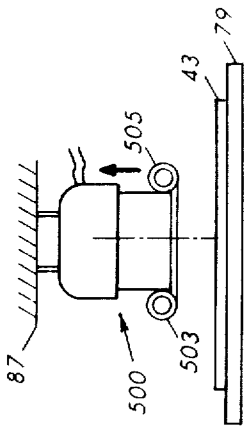
Figure 15:
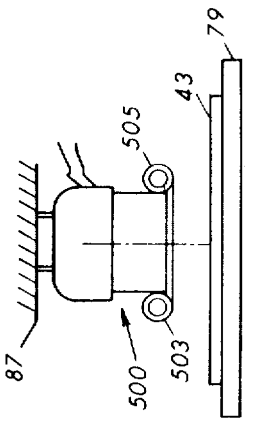
Figure 17:
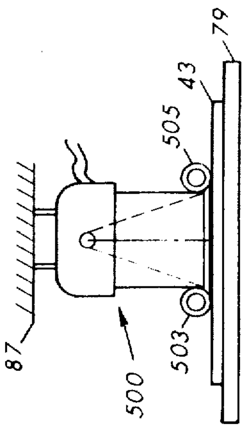

FIGS. 15, 16, 17 and 18 illustrate the sequence of operations during a printing cycle with the apparatus of FIG. 14. Referring to FIG. 15, at any particular imposition station, after the X- and Y-servomotors have stopped at the addressed location, the head 500 is in the raised position. As shown in FIG. 16, the next step is to lower the head 500, claiming the first transparency in position over the desired imposing region. Next, as indicated in FIG. 17, the exposure is made for time sufficient to activate the diazocoating on the plate 43. Finally, as shown in FIG. 18, the head 500 is raised and its reaching the upper position can be used to actuate a limit switch to signal the next address loading for the registers XR and YR.

As discussed above, the various page plates comprising a loaded magazine, or of a sheet of film, can be prearranged in a desired order in the magazine or roll film and the printing sequence determined by appropriately ordering the magazines or different rolls of film. Another approach is to encode each page plate with a code sequence indicating the information on it, or the address at which it is to be printed, or both. For example, pages 3 and 200 of a book might be printed at the same address on different plates. On these page plates could be recorded both the plate number, that would associate the page with other pages to be printed on the same plate, and the address on the plate at which it was to be located.

FIG. 19 shows a convenient means for interpreting such data. As indicated, the slide 5 is provided with a partition 5A so that the film sheet 3 is divided into a region 3 containing the page information, and a region 3A assigned to record the coded data indicating, for example, where the page is to be printed.

Mounted in the projection head are a pair of reading transducers comprising a pair of thin glass plates 507 and 509. The plate 507 is provided with an optically flat surface at a 45° angle, as indicated at 511, at one end, and a corresponding optically flat angular surface 513 at the other end. A light source array 515 is disposed adjacent the flat 511, such that light from the source 515 is reflected from the flat 511 to the left in FIG. 19, and thence from the flat 513 through the region 3A of the film 3 carrying the coded information to be interpreted.

The glass sheet 509 above the slide 5 is provided with a corresponding optical flat 517 to reflect the light to the right in FIG. 19, and a flat 519 at the other end to reflect the light, which is now encoded with the information recorded on the film section 3A, to a bank of photodetectors 521. The plates 509 and 507 may be disposed so as to read the information on the frame in printing position as it reaches that position, and if that is the case then the photodetectors 521 can load the registers XR and YR directly. Alternatively, it may be more convenient to read a slide before it has reached the printing position and register its address for transfer to the registers XR and YR when it reaches printing position. In either event, the information on the frame 5 is available for use in directing the location on the printing plate where the slide is to be imposed.

FIG. 20 shows the details of the slide 5 somewhat more pictorially and indicates the nature of the plates 507 and 509 in the other dimension.

While we have described our invention with respect to the details of the various embodiments thereof, many changes and variations will occur to those skilled in the art upon reading our description, and such can obviously be made without departing from the scope of our invention.

Having thus described our invention, what we claim is:

1. Imposing apparatus, comprising:

an imposing table for receiving a sensitized plate, registration means on said table for locating a plate thereon in a predetermined position, a translation frame, positioning means mounting said translation frame over said imposing table for movement over a range of positions relative to said registration means, and imaging means mounted on said translation frame for producing an optical image on a plate on said table in a region determined by the relative position of said frame and said registration means, said imposing table being pivotally mounted relative to said frame for movement between a loading position and an imposing position parallel to the plane of the image produced by said imaging means, said imposing apparatus including a base frame adapted to be supported on a horizontal surface, and said positioning means comprises means mounting said translation frame on said base frame for movement in a plane inclined at an oblique angle to the horizontal surface when the base frame is so supported.

2. The apparatus of claim 1, in which said angle is about 55°.

3. An imposing machine, comprising:

a base adapted to be supported on a horizontal surface, an inclined frame mounted on said base and extending upwardly therefrom, imaging means mounted on said inclined frame for movement over a range of positions in a plane inclined at an oblique angle to the surface on which said base is supported, and an imposing table mounted for movement between an imposing position parallel to said plane and a loading position essentially parallel to the surface on which said base is supported, said imposing table being adapted to receive a sensitized matrix and comprising registering means for locating two edges of such a matrix in a predetermined position.

4. The apparatus of claim 3, further comprising:

two-axis positioning means connected to said imaging means for moving it to a position in said plane determined by an applied address signal.

5. The apparatus of claim 4, further comprising:

first and second registers each adapted to store an address coordinate on a different one of the axes of said positioning means, means controlled by said registers for applying a two-axis address signal to said positioning means in accordance with the contents of said registers, memory means for storing a sequence of address coordinates signals, and means responsive to an applied stepping signal for supplying coordinate signals from said memory to said register.

6. The apparatus of claim 4, in which said imaging means comprises:

means for storing a sequence of second members on each of which is recorded an image to be imposed at a predetermined location on a matrix in position on said table, addressing means for sequentially applying address signals defining said locations to said positioning, and record member accessing means synchronized with said addressing means for moving the second member corresponding to the current address signal into imaging position in said imaging means.

7. The apparatus of claim 6, in which said record members comprise:

discrete frames stored in a magazine for independent movement into and out of imaging position.

8. The apparatus of claim 6, in which said record members comprise:

discrete sections of an integral record member.

9. The apparatus of claim 6, in which:

said record members are stored in an ordered sequence in said imaging means, and in which said addressing means comprises memory means for storing an ordered sequence of address signals corresponding to said ordered sequence of record members.

10. The apparatus of claim 6, said record members each has recorded thereon an address signal defining the location on the matrix where the corresponding image is to be imposed, and in which said addressing means comprises means responsive to the recorded signals on said record members for applying said signals to said positioning means.

11. Imposing apparatus, comprising:

support means for receiving a sensitized matrix, registering means mounted on said support means for locating such a matrix in a predetermined position, imaging means mounted for movement in a plane parallel to said support means, said imaging means comprising means for storing a series of record members on each of which an image to be imposed in a different location on a matrix is recorded, sequencing means operable to move said record members sequentially into position at an imaging station, and a lamp mounted adjacent said imaging station for forming an image on a matrix on said support corresponding to the image on said record member, positioning means connected to said imaging means for moving it to a position in said plane relative to said support determined by an applied address signal, memory means for storing a sequence of address signals, transfer means actuable to supply an address signal from said memory means to said positioning means, means responsive to the movement of said positioning means to a position determined by an applied address signal for producing a first signal, means responsive to the location of a record member in imaging position for producing a second signal, means responsive to said first and second signals for producing an energizing signal to energize said lamp, means responsive to said energizing signal for actuating said transfer means, and means responsive to said energizing signal for actuating said sequencing means.

12. The apparatus of claim 11, in which said imaging means comprises:

a projection head.

13. The apparatus of claim 12, in which said imaging means comprises:

a contact printing head.

14. The apparatus of claim 11, in which said record members comprise:

discrete photographic transparencies each mounted in a frame and all stored in a magazine.

15. The apparatus of claim 11, in which said second members comprise:

discrete regions of a common sheet on which regions the several images to be imposed are serially recorded.

* * * * *